April 15, 1958 K. G. BROOKS 2,830,514
PANORAMING TRIPOD HEAD WITH CAMERA ACTIVATING HANDLE
Filed Jan. 5, 1955 2 Sheets-Sheet 1

INVENTOR.
Kenneth G. Brooks
BY
Sam J. Slotsky
ATTORNEY

April 15, 1958  K. G. BROOKS  2,830,514
PANORAMING TRIPOD HEAD WITH CAMERA ACTIVATING HANDLE
Filed Jan. 5, 1955  2 Sheets-Sheet 2

INVENTOR.
Kenneth G. Brooks
BY
Sam J. Slotsky
ATTORNEY

United States Patent Office 2,830,514
Patented Apr. 15, 1958

2,830,514

PANORAMING TRIPOD HEAD WITH CAMERA ACTIVATING HANDLE

Kenneth G. Brooks, Sioux Falls, S. Dak.

Application January 5, 1955, Serial No. 479,991

2 Claims. (Cl. 95—86)

My invention ralates to a movie camera of the type which is commonly mounted on a tripod and which can be swung in a horizontal plane as well as a vertical plane.

An object of my invention is to provide in a camera of this type, means for readily activating or starting the reel of the camera by means of the guide handle of the camera, and by merely twisting the said guide handle, and with further attendant means whereby the handle is returned to normal or deactivating position automatically.

A further object of my invention is to provide an arrangement in which the activating unit is very simple in construction, and whereby the use of the same will provide a very convenient method of operating the camera without necessitating uncomfortable positions of the hands.

Figure 1:
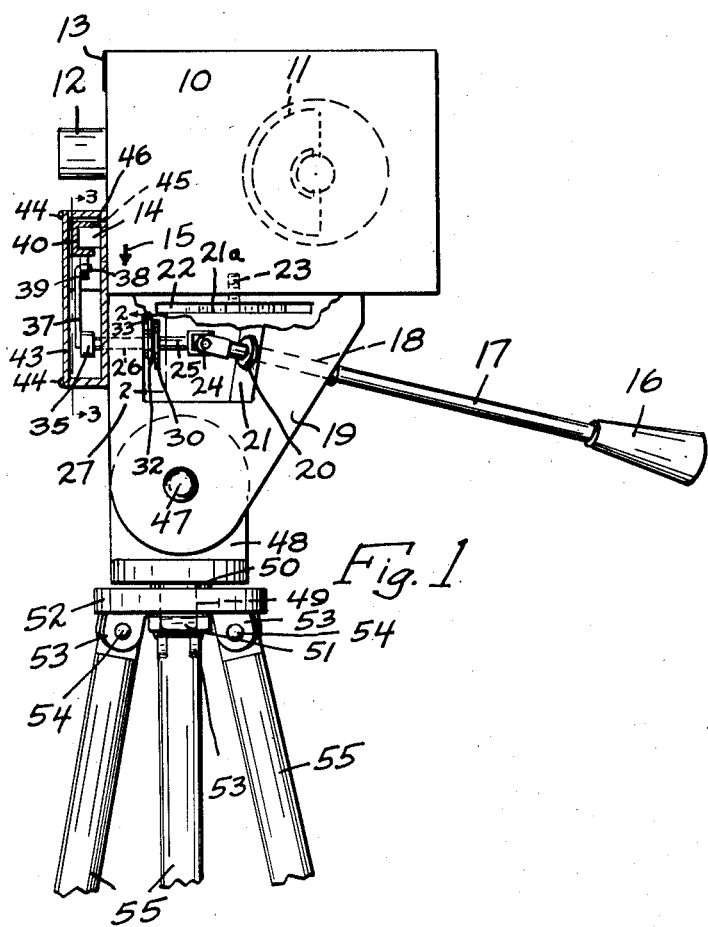
Figure 2:
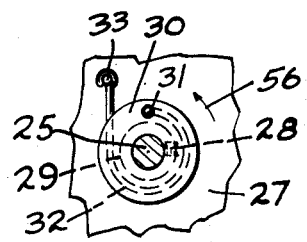
Figure 3:
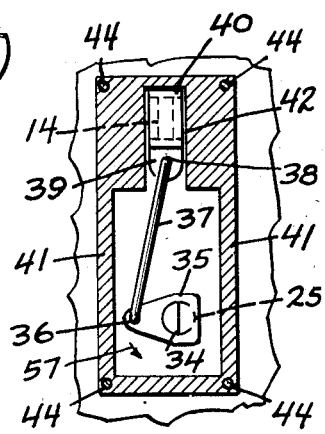
Figure 4:
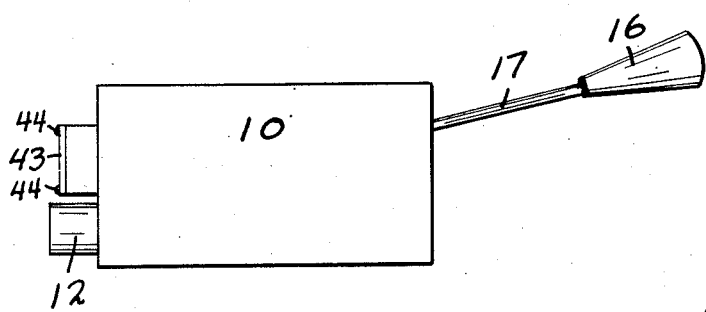
Figure 5:
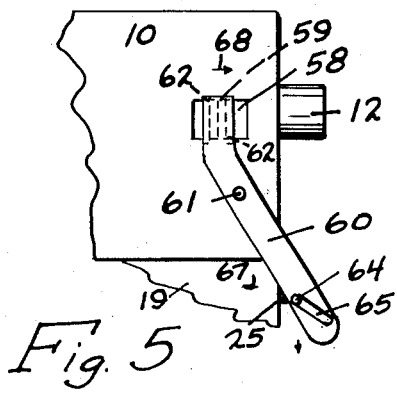
Figure 6:
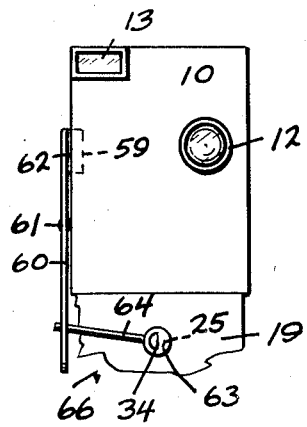
Figure 7:
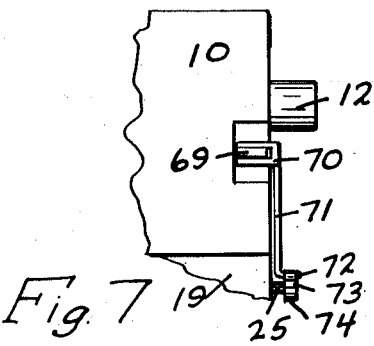
Figure 8:
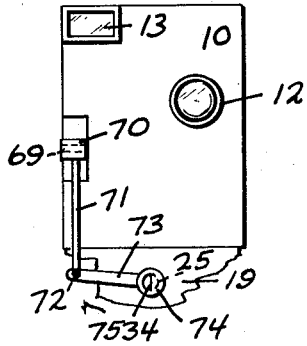
Figure 9:
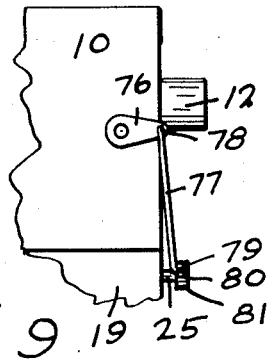
Figure 10:
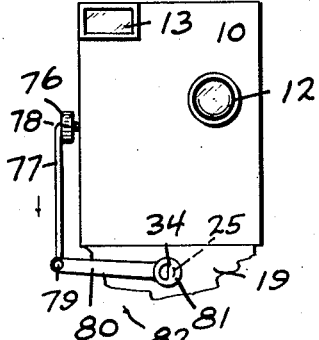

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a side elevation taken partially in cross section showing my device as attached to a panoraming movie camera, Figure 2 is a sectional detail taken along the lines 2—2 of Figure 1, Figure 3 is a sectional detail of Figure 1 taken along the lines 3—3 thereof, Figure 4 is a plan view of Figure 1, Figure 5 is a side elevation of a modified form of the device, Figure 6 is a forward view of Figure 5, Figure 7 is a further modification, Figure 8 is a forward view of Figure 7, Figure 9 is a further modification, and Figure 10 is a forward view of Figure 9.

My invention contemplates the provision of a means for activating a camera reel without requiring the use of the other hand of the operator while the operator is moving the camera with the usual handle, and to provide means whereby the operator can quickly activate the camera by merely twisting the said handle.

I have used the character 10 to designate the box-like structure in which the camera film is enclosed, the character 11 indicating the winding mechanism, the character 12 indicating the lens opening, and the character 13 the view finder. I have further used the character 14 to designate the usual lever which is commonly provided in such cameras, and which lever is moved downwardly in the direction of the arrow 15 (see Figure 1) and which usually must be pressed downwardly by means of the other hand as the handle member 16 is used to guide the camera, the manipulation of the member 14 thereby being quite cumbersome and inconvenient since the operator must place his hand around to the front of the camera while manipulating the same with the other hand.

I have further used the character 17 to indicate a rod attached to the handle portion 16, the rod 17 being journalled at 18 within a bracket member 19, and attached to the rod 17 is a collar 20 which abuts against the angularly positioned surface 21, it being noted that the rod 17 is inclined as shown principally in Figure 4 to be out of the way of the operator.

The bracket 19 is preferably made approximately as shown but can be made in other forms as well, and suitably secured to the bracket 19 by means of a circular member 21a passing within a slot 22 is the camera 10, the member 21a having the threaded stud 23 for engaging the camera.

Attached at the end of the shaft 17 is a universal joint member 24, it being specifically understood that this joint could be in a variety of forms as long as it transmits the twisting effect, such as flexible cables, other inter-locking types, etc., and secured to the other end of the universal joint 24 is a shaft 25 which is journalled at 26 within the further portion 27 of the bracket 19, and attached to the shaft 25 by means of the set screw 28 (see Figure 2) is a collar 29 having the annular flange 30, and attached at 31 to the flange 30 is a substantially circular spring member 32 which is securely attached at 33 to the bracket portion 27. The shaft 25 includes a cut-out portion at 34 which is adapted to be received within the arm member 35 to thereby lock the arm member to the shaft 25 so that it will rotate therewith, and pivotally attached to the arm member 35 at 36 is the link 37 which is pivotally secured at 38 to the ear 39 which ear 39 is attached to the substantially U-shaped member 40, which member 40 receives the lever 14.

A suitable casing having the side walls 41 and the restricted portion at 42 can be attached to the camera, and can include a plate 43 attached thereto by means of the screws 44, it being noted that by virtue of this construction the member 40 will snugly engage the member 14 and be held in this position at all times, and if desired, a small slot can be provided at 45 in which the tongue 46 can fit, the tongue being an extension of the U-shaped member 40.

The bracket member 19 is pivotally secured at 47 to a further base member 48 which is attached to a pin 49 which pin passes through a suitable spacer 50, to which pin is attached the lower nut 51, which can loosely abut against the tripod top 52 to which tripod are secured the usual ears 53, to which ears are pivoted at 54 the tripod legs 55.

The device operates in the following manner. It will be noted that the handle 16 and rod 17 permit the camera to be swung in a horizontal plane as well as a vertical plane through the provision of the various pivotal joints at 47 and 49. It will be noted that the spring member 32 will maintain the shaft portions 25 and 17 in fixed position, and yet will allow resilient rotary movement thereof. Therefore, as soon as the operator desires to activate the camera, he merely twists the handle 16 in the direction of the arrow 56 as shown in Figure 2 which correspondingly will rotate the shaft 17 and shaft 25 and will further rotate the member 35 (see Figure 3) in the direction of the arrow 57, which will draw the link 37 and member 40 downwardly, thereby pulling the lever 14 downwardly and thence activating the camera. In this way, the camera is readily activated with merely a twisting motion, and not requiring uncomfortable positioning of the other hand, and as soon as it is desired to release the lever 14, the handle member 16 is released, the spring 32 thence carrying the shaft back to normal deactivated position. It will thus be noted that the operation is convenient, instantaneous, and does not require the use of cumbersome thumb levers and the like.

It will be equally obvious that other constructions can be used involving the same principles mentioned hereinabove, Figures 5 to 10 illustrating further forms of cameras having different trigger arrangements, identical characters indicating identical parts.

Figure 5 illustrates a modification wherein the camera includes a recessed opening at 58 in which is located the trigger member 59, and in this modification I provide a lever 60 which is pivoted at 61 to the camera, the lever 60 terminating in the pair of flanges 62 which freely straddle the trigger 59, and attached to the shaft portion 34 is the member 63 to which is attached the bar 64 received in the angular slot 65 which is formed in the lever 60, and when the shaft 25 is rotated in the direction of the arrow 66 due to the angularity of the slot 65, the lever member 60 will be forced in the direction of the arrow 67, thereby causing the upper portion of the lever to move in the direction of the arrow 68 and activating the trigger 59.

A still further modification is shown in Figures 7 and 8 in which the trigger member is indicated by the character 69 and in this type a U-shaped member 70 will straddle the member 69, the member 70 being attached to the rod 71 which is pivotally secured at 72 to a bar 73 which is attached to a member 74 which is attached to the shaft portion 34, movement of the shaft 25 in the direction of the arrow 75 moving the trigger member 69 downwardly.

Figures 9 and 10 illustrate a still further modification in which the activating trigger is indicated by the character 76 in which if desired a suitable channel member can be forced onto this lever member, with a rod 77 being secured to the channel, or the rod 77 can pass through a suitable opening 78 in the lever member 76, the rod 77 being pivotally secured at 79 to a bar 80 including the portion 81, the portion 81 being secured to the portion 34 of the shaft 25, it being obvious that the rotation of the shaft 25 in the direction of the arrow 82 will activate the lever 76.

It should be specifically understood that any other types of constructions could be used, and the modifications shown in Figures 5 to 10 inclusive could also include suitable housings enclosing the mechanisms, somewhat similar to the housing shown in Figures 1 to 4, it being equally obvious that other structures could be employed, the principal spirit of my invention, however, residing in the rotatable guide handle which activates the camera mechanism. It should also be understood as well that any type of spring arrangement other than the spring 32 could be employed, such as a coiled helical spring, etc.

It will now be seen that I have provided the various advantages mentioned in the objects of my invention with other advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. In combination with an panoraming type camera having an activating member, an elongated handle member, said handle member being freely journalled whereby said handle member can be rotated, means connected between said handle member and said activating member for operating said activating member upon said rotation, said handle member including a spring biased member attached thereto whereby said handle member will be returned to deactivating position when released after rotation thereof, said connected means including a lever member attached to the terminal of said handle member, a link connected to said lever member and to said activating member, a bracket for supporting said camera, said elongated handle member including a pair of portions journalled in said bracket, said portions being mutually connected by means of a universal type joint whereby said portions can be positioned angularly with respect to each other.

2. In combination with a panoraming type camera having an activating member, an elongated handle member, said handle member being freely journalled whereby said handle member can be rotated, means connected between said handle member and said activating member for operating said activating member upon said rotation, said handle member including a spring biased member attached thereto whereby said handle member will be returned to deactivating position when released after rotation thereof, said connected means including a lever member attached to the terminal of said handle member, a link connected to said lever member and to said activating member, a bracket for supporting said camera, said elongated handle member including a pair of portions journalled in said bracket, said portions being mutually connected by means of a universal type joint whereby said portions can be positioned angularly with respect to each other, said spring biased member including a coiled spring member, one end of which is secured to one of said handle portions, the other end of which is secured to said bracket.

References Cited in the file of this patent

UNITED STATES PATENTS

| 1,645,923 | Ohlau | Oct. 18, 1927 |
| 2,349,932 | Back | May 30, 1944 |

FOREIGN PATENTS

| 500,873 | Germany | June 25, 1930 |